US012760722B2

(12) United States Patent
Dalum

(10) Patent No.: US 12,760,722 B2
(45) Date of Patent: Oct. 13, 2026

(54) OIL FREE THREE-STAGE RECIPROCATING COMPRESSOR AND $CO_2$ SYSTEM COMPRISING SUCH A COMPRESSOR

(71) Applicant: DALUM Beverage Equipment ApS, Sønder sø (DK)

(72) Inventor: Kim Christian Dalum, Odense (DK)

(73) Assignee: DALUM Beverage Equipment ApS, Sønder sø (DK)

( * ) Notice: Subject to any disclaimer, the term of this patent is extended or adjusted under 35 U.S.C. 154(b) by 676 days.

(21) Appl. No.: 18/015,326

(22) PCT Filed: Jul. 9, 2021

(86) PCT No.: PCT/EP2021/069175
§ 371 (c)(1),
(2) Date: Jan. 9, 2023

(87) PCT Pub. No.: WO2022/008722
PCT Pub. Date: Jan. 13, 2022

(65) Prior Publication Data

US 2023/0272790 A1 Aug. 31, 2023

(30) Foreign Application Priority Data

Jul. 10, 2020 (DK) ............................. PA202070475

(51) Int. Cl.
*B01D 53/02* (2006.01)
*B01D 53/00* (2006.01)
(Continued)

(52) U.S. Cl.
CPC .......... *F04B 39/064* (2013.01); *B01D 53/002* (2013.01); *B01D 53/1475* (2013.01);
(Continued)

(58) Field of Classification Search
CPC ........ B01D 2252/103; B01D 2253/102; B01D 2253/104; B01D 2256/22;
(Continued)

(56) References Cited

U.S. PATENT DOCUMENTS 4,345,880 A 8/1982 Franco
4,957,416 A * 9/1990 Miller .................. F04B 27/053 92/72
2019/0277272 A1 9/2019 Chun-Chung

FOREIGN PATENT DOCUMENTS

CN 204058431 U 12/2014
DE 1808051 A1 5/1970
DE 2301709 7/1974

OTHER PUBLICATIONS

International Search Report and Preliminary Report on Patentability from parent Int'l Pat. App. PCT/EP2021/069175, Oct. 28, 2021 (12 pp.).

* cited by examiner

*Primary Examiner* — Christopher P Jones
(74) *Attorney, Agent, or Firm* — HOLLAND & HART LLP

(57) ABSTRACT

The disclosure relates to a three-stage reciprocating compressor comprising pistons and suction and compression chambers in which a medium is compressed for each separate stage, which stages are connected in series and where a first stage is fluidly connected to an inlet for inlet of uncompressed or pre-compressed gas where the three-stage pistons move synchronously along a common axis in one connected unit such that the first and second stage suction and compression chambers share piston as well as cylinder wall, and having separate cylinder heads, a top headpiece and a bottom headpiece on each side of the piston, the third stage piston extending from a center of the first and second stage common piston and is passed through an opening in the cylinder head of the first stage suction and compression chamber, in extension of which is placed a third stage cylinder tube with a smaller diameter than a diameter of the cylinder for stage one and two, each stage fluidly separated by one or more one way valves, where the second stage suction and compression chamber is formed between the cylinder wall and a piston skirt as well as between an underside of the piston and the headpiece placed in a bottom of the cylinder.

21 Claims, 3 Drawing Sheets

(51) Int. Cl.

| | |
|---|---|
| ***B01D 53/14*** | (2006.01) |
| ***B01D 53/26*** | (2006.01) |
| ***C12F 3/02*** | (2006.01) |
| ***F04B 25/00*** | (2006.01) |
| ***F04B 37/10*** | (2006.01) |
| ***F04B 39/06*** | (2006.01) |
| ***F04B 53/14*** | (2006.01) |

(52) U.S. Cl.
CPC ....... *B01D 53/1493* (2013.01); *B01D 53/261* (2013.01); *B01D 53/265* (2013.01); *C12F 3/02* (2013.01); *F04B 25/00* (2013.01); *F04B 37/10* (2013.01); *F04B 53/143* (2013.01); *B01D 2252/103* (2013.01); *B01D 2253/102* (2013.01); *B01D 2253/104* (2013.01); *B01D 2256/22* (2013.01); *B01D 2257/104* (2013.01); *B01D 2258/0275* (2013.01)

(58) Field of Classification Search
CPC ...... B01D 2257/104; B01D 2258/0275; B01D 53/002; B01D 53/1475; B01D 53/1493; B01D 53/261; B01D 53/265; F04B 2203/0209; F04B 2205/00; F04B 25/00; F04B 25/02; F04B 37/10; F04B 39/0022; F04B 39/064; F04B 39/121; F04B 39/16; F04B 5/02; F04B 53/143; C12F 3/02; Y02C 20/40
See application file for complete search history.

OIL FREE THREE-STAGE RECIPROCATING COMPRESSOR AND $CO_2$ SYSTEM COMPRISING SUCH A COMPRESSOR

CROSS-REFERENCE TO RELATED APPLICATIONS

This is a national phase application of International Application No. PCT/EP2021/069175, filed 9 Jul. 2021, which claims the benefit of Denmark Patent Application No. PA202070475, filed 10 Jul. 2020, the disclosures of which are incorporated herein, in their entireties, by this reference.

TECHNICAL FIELD

The present disclosure relates to a three-stage reciprocating compressor comprising pistons and suction and compression chambers in which a medium is compressed for each separate stage, which stages are connected in series and where a first stage is fluidly connected to an inlet for inlet of uncompressed or pre-compressed gas where the three-stage pistons move synchronously along a common axis in one connected unit such that the first and second stage suction and compression chambers share piston as well as cylinder wall, and having separate cylinder heads, a top headpiece and a bottom headpiece on each side of the piston, the third stage piston extending from a center of the first and second stage common piston and is passed through the cylinder head of the first stage suction and compression chamber, in extension of which is placed a third stage cylinder tube with a smaller diameter than a diameter of the cylinder for stage one and two each stage fluidly separated by one or more one way valves.

The present disclosure also relates to a system for a $CO_2$ regeneration plant comprising a foam trap, a low pressure water scrubber, a stepless three-stage compressor comprising one or more intercoolers or cooling units and water separators, a regenerable dehydrator and a condensing unit comprising a condenser and a reboiler, where the compressor is a three-stage reciprocating compressor.

BACKGROUND ART

In general, oil free reciprocating compressors are known. For example different applications within the food industry or in the medical sector makes use of oil free reciprocating compressors.

Compressors with more than one stage is also known. From GB 520,521 a multistage compressor is known. Such a multistage compressor having three or more stages, where two lower stages are included in a common cylinder thus having equal cylinder diameter and piston strokes, and where the first stage is arranged in the cylinder adjacent to the cylinder end facing in the direction away from the crankshaft and the second stage adjacent to the cylinder end facing in the direction toward the crankshaft is distinguished in that the common piston for the first and second stages is not stepped down and the necessary decrease in the suction volume of the second stage is effected solely by increasing the clearance of this increased second stage in the inner dead center position of the piston. The single-acting stages of higher pressures being so combined with this double-acting cylinder that the gas pressures thereof act in opposition to those of the second stage, the arrangement being such that equal efficiency of operation of the crank gear can be obtained for alternating strokes of the piston.

Such a compressor has the drawback that it is necessary to combine a number of cylinders if a high pressure is to be achieved. First and second step is not capable of providing a compression ratio being high enough due to the almost equal volume of first and second suction and compression chamber. In fact, the second chamber is used to build up a helping pressure, easing the compression stroke of stage 1 and 3, which strokes takes place simultaneously.

The problem to be solved is to build up a pressure by a three-stage compressor where each stage increases the pressure by a factor 3 or more (has a compression ratio of 1:3 or more).

SUMMARY

It is an object of the present disclosure to mitigate, alleviate or eliminate one or more of the above-identified deficiencies and disadvantages in the prior art and solve at least the above mentioned problem.

According to a first aspect there is provided a three-stage reciprocating compressor comprising pistons and suction and compression chambers in which a medium is compressed for each separate stage, which stages are connected in series and where a first stage is fluidly connected to an inlet for inlet of uncompressed or pre-compressed gas where the three-stage pistons move synchronously along a common axis in one connected unit such that the first and second stage suction and compression chambers share piston as well as cylinder wall, and having separate cylinder heads, a top headpiece and a bottom headpiece on each side of the piston, the third stage piston extending from a center of the first and second stage common piston and is passed through an opening in the cylinder head of the first stage compression chamber, in extension of which is placed a third stage cylinder tube with a smaller diameter than a diameter of the cylinder for stage one and two, each stage fluidly separated by one or more one way valves, where the second stage suction and compression chamber is formed between the cylinder wall and a piston skirt as well as between an underside of the piston and the headpiece placed in a bottom of the cylinder.

This can also be achieved by an embodiment where the piston is formed by a piston head and a piston skirt, where the piston head has a larger diameter than the piston skirt whereby an underside of the piston head and an outer side of the piston skirt together with the cylinder wall and the headpiece placed in a bottom of the cylinder forms the second stage suction and compression chamber.

In an embodiment, the third stage piston is connected to the piston head of stage one and two by a piston rod.

In an embodiment, at least one of the top headpiece or bottom headpiece is provided with rider rings for guiding the piston skirt or piston in relation to the cylinder wall or headpieces.

In an embodiment, at least one of the top headpiece or bottom headpiece is provided with piston rings or compression rings for sealing to the piston skirt or piston.

In an embodiment, the piston head is provided with piston rings or compression rings for sealing against the cylinder wall.

In an embodiment, the piston skirt is provided with piston rings or compression rings for sealing against a cylinder head or a cylinder wall.

In an embodiment, the first and second stage common piston is provided with a one way valve leading gas from stage one to stage two.

In an embodiment, a connecting rod is rotatably connected to the piston within the piston skirt in the piston head end of the piston.

In an embodiment, the connecting rod is rotatably connected to the piston within the piston skirt in the piston head end of the piston at a distance from a bottom of the piston head corresponding to ⅓ or less of a diameter of the piston head.

In an embodiment, the connecting rod can be connected to the underside of the piston.

In an alternative embodiment, the piston skirt can form the connecting rod. This can be advantageous in case the construction of the drive means for the pistons comprises a cross-head, whereby the movement of the connection rod between the piston and the cross-head is linear.

The three-stage compressor comprises a first suction and compression chamber fluidly connected to a second suction and compression chamber and a third suction and compression chamber fluidly connected to the second suction and compression chamber, where all three suction and compression chambers have a common acting piston and where the fluid connections each are provided with valves securing flow in one direction only.

The suction and compression chambers are all cylindrical or ring shaped chambers i.e. the suction and compression chambers all having a cylindrical or cylinder sleeve shaped form.

The three-stage compressor can be driven by an electric motor via a crankshaft, via which a connecting rod causes a reciprocating movement of a piston. The connecting rod is connected to the crankshaft and to the piston by means of bearings.

In an embodiment, the reciprocating motion may be induced by a linear actuator or by a hydraulic or pneumatic cylinder.

The piston comprises three main parts, which parts in an embodiment can be formed in one piece and in another embodiment assembled by two or more parts.

A central part of the piston here named piston head is on its side pointing away from the crankshaft provided with a cylindrical protrusion having a diameter smaller than the piston head and placed concentrically relative to the piston head. The piston head acts as a double action piston and the cylindrical protrusion acts as a single action piston. On a side of the piston head pointing towards the crankshaft, a piston skirt extends. The piston skirt differs from a normal piston skirt by not having substantially same diameter as the piston head, but having a smaller diameter.

The first and second suction and compression chamber is separated from each other by the piston head, but connected by a fluid channel, which can be closed by a valve. The valve is a check valve or a one way valve and can in a simple embodiment be a resilient plate abutting a plane surface surrounding a hole or the valve can be a ball valve or any other kind of check valves acting as a one way valve.

The second and third suction and compression chamber is separated from each other by the piston head and the cylindrical protrusion placed concentrically relative to the piston head, but connected by a fluid channel, which can be closed by a valve. The valve is also a check valve or a one way valve and can in a simple embodiment be a resilient plate abutting a plane surface surrounding a hole or the valve can be a ball valve or any other kind of check valves acting as a one way valve.

The first suction and compression chamber is in an end pointing in the opposite direction relative to the connecting rod provided with a main cylinder head having an inlet opening and an outlet opening for fluid connection with the second suction and compression chamber. Centrally in the cylinder head is an opening through which the single action piston formed by the cylindrical protrusion placed concentrically relative to the piston head can move. On an outside of the main cylinder head a cylinder comprising the third suction and compression chamber is placed. In an opposite end of the third suction and compression chamber, a third cylinder head is placed.

The first and second suction and compression chamber shares a common cylinder wall where the first suction and compression chamber is placed on one side of piston head and the second suction and compression chamber is placed on the opposite side of the piston head. The second suction and compression chamber being placed closest to the crankshaft. A second cylinder head is placed at the opposite end of the shared cylinder wall and the second cylinder head is provided with an opening through which the piston skirt can move.

The piston skirt extends from the piston head and towards the crankshaft and the length of the piston skirt must at least be equal to or longer than a stroke length of the compressor plus thickness of the second cylinder head.

The piston skirt having a diameter smaller than the piston head provides the second suction and compression chamber formed between the underside of the piston head, the shared cylinder wall and the second cylinder head.

A typical cycle for the compressor will then be: when the piston head moves down, gas is sucked or let in through the inlet in the first cylinder head. The gas can be at atmospheric pressure or the gas can be precom pressed. When the piston reaches its Bottom Dead Center (BDC) and begins to move towards the first cylinder head a compression stroke for the first suction and compression chamber begins and a first check valve or one way valve provided in the inlet will shut. Gas will be compressed and forced through an outlet opening via a first fluid connection, which can be piping or channels, to an inlet to the second suction and compression chamber through a second check valve or one way valve. When reaching a Top Dead Center (TDC) the first suction and compression chamber is at its minimum volume and next intake stroke (suction) can begin. Now with the second suction and compression chamber filled with compressed gas and when the piston head beginning to draw gas into the first suction and compression chamber, the second one way valve will shut and gas is compressed further in the second suction and compression chamber forcing the gas into the third suction and compression chamber through an outlet opening via a second fluid connection, which can be piping or channels, to an inlet to the third suction and compression chamber through a third check valve or one way valve. When again reaching the BDC a compression stroke begins compressing gas in both the first and third suction and compression chambers is compressed. From the third suction and compression chamber, which is the last compression stage in a three-stage compressor an outlet, which outlet can be provided with a fourth check valve or one way valve, the compressed gas is discharged into a storage container.

In an embodiment, a one way valve is provided at each end of the fluid connections, close to the suction and compression chambers.

In an embodiment, a one way valve is provided at each end of the fluid connections, at the inlet opening and the outlet opening of the suction and compression chambers. Hereby influence from volume in the fluid connection during compression is avoided.

The container may be a pressure vessel in the form of a gas bottle, for example a diving tank or cylinder, a welding gas bottle/cylinder or the like.

The compressor can also be used in combination with a condensing unit in which the gas is liquefied.

In an embodiment the piston head, the piston skirt and the third piston are provided with sealing means, such as piston rings or compression rings, for sealing during reciprocating movement of the parts in relation to the cylinder wall, the second cylinder head and the first cylinder head, respectively.

In an embodiment, sealing means is provided in the openings of the cylinder heads through which the piston skirt and the third stage piston moves.

In an embodiment, sealing means is provided in the piston skirt for sealing against an opening in the cylinder head or against the cylinder wall.

In an alternative embodiment, between moving and non-moving parts of the pistons and cylinders is provided rider rings. Rider rings are used mainly in oil free or mini-lube compressors for parts moving relative to each other. The function of rider rings is to support or guide the piston assembly and prevent contact between the piston and the cylinder (risk of seizure).

According to a further aspect there is provided a system for a $CO_2$ regeneration plant comprising a foam trap, a low pressure water scrubber, a stepless three-stage compressor comprising one or more intercoolers or cooling units and water separators, a regenerable dehydrator and a condensing unit comprising a condenser and a reboiler, where the compressor is a three-stage reciprocating compressor according to one or more of the preceding aspects.

In an embodiment of the system, the system further comprises a high pressure water scrubber.

In an embodiment of the system, the regenerable dehydrator contains a granulate capable of absorbing volatile gases, said gases being regenerated by heating the dehydrator.

In an embodiment of the system, an activated carbon filter is placed before the regenerable dehydrator.

In an embodiment of the system, an activated carbon filter is integrated in the regenerable dehydrator.

By combining activated alumina in the dehydrator or adsorber with activated carbon is achieved that water vapor and volatile organic gases such as acetaldehyde as well as compounds such as for example sulfur compound can be removed from the system. An advantage of using an activated carbon filter is that the filter should be replaced only a few times a year.

In an embodiment of the system, the regenerable dehydrator is an adsorber.

In an embodiment of the system, the speed of the compressor is variable between 0 to full speed where the speed is controlled by a pressure sensor placed in the system before the compressor, keeping the inlet pressure at an interval between 0.1 and 1.0 bar (10 and 100 kPa), preferably between 0.2 and 0.5 bar (20 and 50 kPa).

The compressor and embodiments of the compressor described above makes it possible to run a $CO_2$ regeneration plant for example for smaller breweries, in such a way that refrigerants containing Freon and like unwanted refrigerants can be avoided in such a system.

CFC or ammonia refrigeration systems are expensive or require special permits.

By using this improved three-stage reciprocating compressor makes it possible to press the compressed gas into a condensing unit in which the gas is liquefied. Hereby it is possible condensing the gas, which gas can be $CO_2$ or another suitable gas in the condensing unit at a pressure of 35-45 bar (3.5-4.5 Mpa).

By condensing the gas at a pressure high pressure of 35-45 bar (3.5-4.5 Mpa) it is possible to condense at temperatures around −5 to 2° C. and thereby it is possible to make use of a cooling system present for cooling of fermenting tanks in a brewery, avoiding use of CFC or ammonia refrigeration systems.

Hereby it is possible to use glycol as cooling media for a cooling system of the compressor and the $CO_2$ regeneration plant.

Effects and features of the different embodiments are to a large extent analogous to those described above in connection with the first embodiment.

Embodiments mentioned in relation to the first embodiment are largely compatible with the second through seventh aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles “a”, “an”, “the”, and “said” are intended to mean that there are one or more of the elements unless the context explicitly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1:
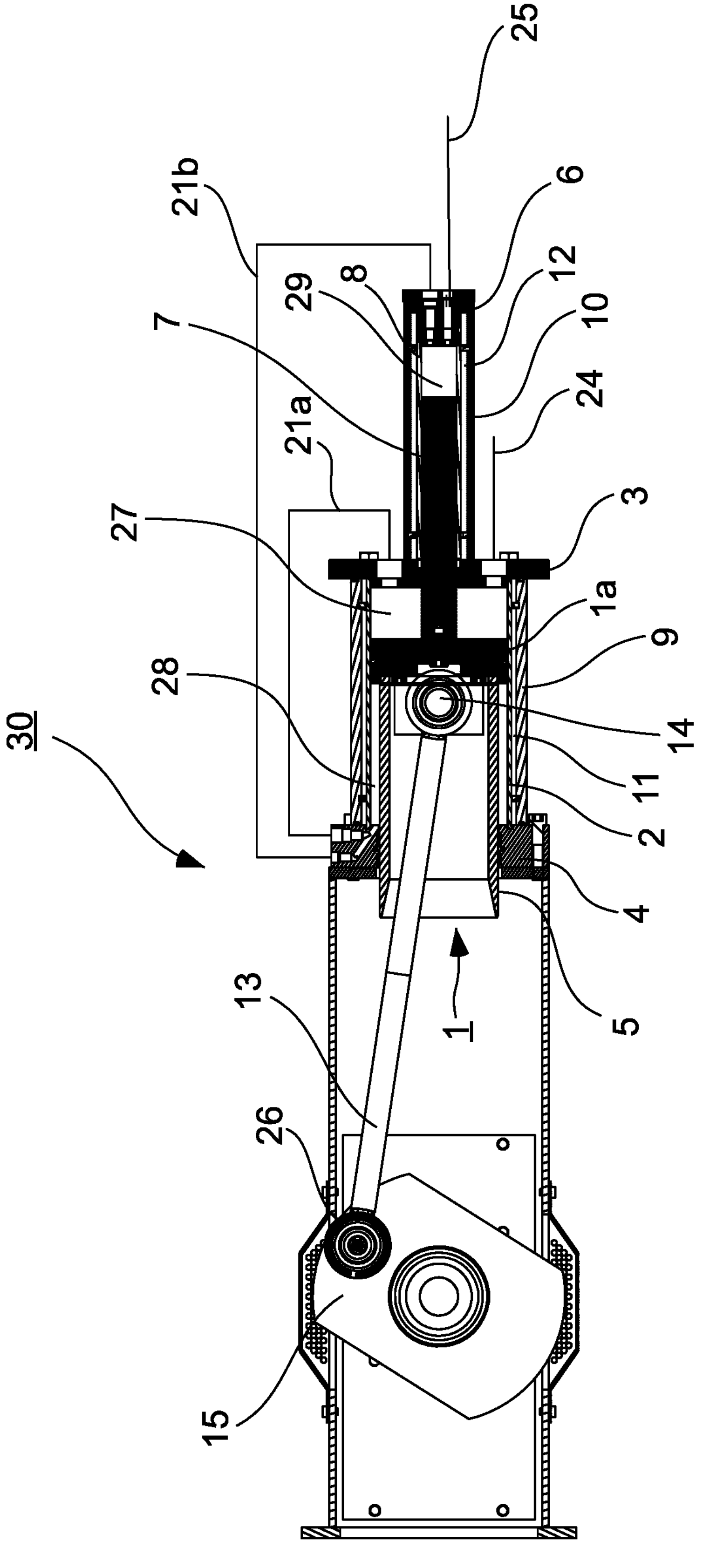
FIG. 1 shows an example of a three-stage compressor shown in cross section.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

A three-stage compressor 30 according to the present disclosure comprises a first suction and compression chamber 27 fluidly connected to a second suction and compression chamber 28 and a third suction and compression chamber 29 fluidly connected to the second suction and compression chamber 28, where all three suction and compression chambers 27, 28, 29 have a common acting piston 1, 7 and where fluid connections 21*a*, 21*b* each are provided with valves 20*a*-20*f* securing flow in one direction only.

The suction and compression chambers 27, 28, 29 are all cylindrical or ring shaped chambers i.e. the suction and compression chambers 27, 28, 29 all having a cylindrical or cylinder sleeve shaped cross-section.

The three-stage compressor 30 can be driven by an electric motor 40 via a crankshaft 15, via which a connecting rod 13 causes a reciprocating movement of a piston 1, 7. The connecting rod 13 is connected to the crankshaft 15 and to the piston 1 by means of bearings 14, 26.

In an embodiment, the crankshaft 15 is unilaterally suspended directly on a gear motor (not shown), where a gear bearing is used as a crank bearing.

The compressor 30 is preferably an oilfree low-speed compressor. Hereby wear is reduced due to low piston velocity.

This compressor 30 further has the characteristic that only very little excessive heat is generated and therefore the compressor may not need to be cooled. In fact, in some cases it may be advantageous to supply heat to the compressor.

In an embodiment the reciprocating motion may be induced by a linear actuator or by a hydraulic or pneumatic cylinder (not shown).

The piston 1, 7 comprises three main parts, which parts in an embodiment can be formed in one piece and in another embodiment assembled by two or more parts 1, 1*a*, 7.

A central part of the piston 1 here named piston head 1*a* is on its side pointing away from the crankshaft 15 provided with a cylindrical protrusion 7 having a diameter smaller than the piston head 1*a* and placed concentrically relative to the piston head 1*a*. The piston head 1*a* acts as a double action piston and the cylindrical protrusion 7 acts as a single action piston. On a side of the piston head 1*a* pointing towards the crankshaft 15, a piston skirt 5 extends. The piston skirt 5 differs from a normal piston skirt 5 by not having substantially same diameter as the piston head 1*a*, but having a smaller diameter.

The first and second suction and compression chamber 27, 28 is separated from each other by the piston head 1*a*, but connected by a fluid channel 21*a*, which can be closed by at least one valve 20*b*, 20*c*. The valve is a check valve or a one way valve and can in a simple embodiment be a resilient plate abutting a plane surface surrounding a hole or the valve can be a ball valve or any other kind of check valves acting as a one way valve.

The second and third suction and compression chamber 28, 29 is separated from each other by the piston head 1*a* and the cylindrical protrusion 7 placed concentrically relative to the piston head 1*a*, but connected by a fluid channel 21*b*, which can be closed by at least one valve 20*d*, 20*e*. The valve 20*d*, 20*e* is also a check valve or a one way valve and can in a simple embodiment be a resilient plate abutting a plane surface surrounding a hole or the valve can be a ball valve or any other kind of check valves acting as a one way valve.

The first suction and compression chamber 27 is in an end pointing in the opposite direction relative to the connecting rod 13 provided with a main cylinder head 3 having an inlet opening 24 and an outlet opening for fluid connection with the second suction and compression chamber 28. The outlet opening can be closed by a one way valve 20*b*. Centrally in the cylinder head 3 is an opening through which the single action piston 7 formed by the cylindrical protrusion placed concentrically relative to the piston head 1*a* can move. On an outside of the main cylinder head 3 a cylinder 8 comprising the third suction and compression chamber 29 is placed. In an opposite end of the third suction and compression chamber 29, a third cylinder head 6 is placed.

The first and second suction and compression chamber 27, 28 shares a common cylinder wall 2 where the first suction and compression chamber 27 is placed on one side of the piston head 1*a* and the second suction and compression chamber 28 is placed on the opposite side of the piston head 1*a*. The second suction and compression chamber 28 being placed closest to the crankshaft 15. A second cylinder head 4 is placed at the opposite end of the shared cylinder wall 2 and the second cylinder head 4 is provided with an opening through which the piston skirt 5 can move.

The piston skirt 5 extends from the piston head 1 and towards the crankshaft 15 and the length of the piston skirt 5 must at least be equal to or longer than a stroke length of the compressor 30 plus thickness of the second cylinder head 4.

The piston skirt 5 having a diameter smaller than the piston head 5 provides the second suction and compression chamber 28 formed between the underside of the piston head 1*a*, the piston skirt 5, the shared cylinder wall 2 and the second cylinder head 4.

A typical cycle for the compressor 30 will then be: when the piston head 1*a* moves down, gas is sucked or let in through the inlet 24 in the first cylinder head 3. The gas can be at atmospheric pressure or the gas can be precompressed. When the piston 1 reaches its Bottom Dead Center (BDC) and begins to move towards the first cylinder head 3 a compression stroke for the first suction and compression chamber 27 begins and a first check valve or one way valve 20*a* provided in the inlet 24 will shut. Gas will be compressed and forced through an outlet opening via a first fluid connection 21*a*, which can be piping or channels, to an inlet to the second suction and compression chamber through a second and third check valve or one way valve 20*b*, 20*c*. When reaching a Top Dead Center (TDC) the first suction and compression chamber 27 is at its minimum volume and next intake stroke (suction) can begin. Now with the second suction and compression chamber 28 filled with compressed gas and when the piston head 1*a* beginning to draw gas into the first suction and compression chamber 27, the second one way valve 20*b* will shut and gas is compressed further in the second suction and compression chamber 28 forcing the gas into the third suction and compression chamber 29 through an outlet opening via a second fluid connection 21*b*, which can be piping or channels, to an inlet to the third suction and compression chamber 29 through a fourth and fifth check valve or one way valve 20*d*, 20*e*. When again reaching the BDC a compression stroke begins compressing, gas in both the first and third suction and compression chambers 28, 29 is compressed. From the third suction and compression chamber 29, which is the last compression stage in a three-stage compressor an outlet 25, which outlet 25 can be provided with a sixth check valve or one way valve 20*f*, the compressed gas is discharged into a storage container.

In an embodiment, a one way valve 20*a*-20*f* is provided at each end of the fluid connections 21*a*, 21*b*, close to the suction and compression chambers 27, 28, 29.

In an embodiment, a one way valve 20*a*-20*f* is provided at each end of the fluid connections 21*a*, 21*b*, at the inlet opening and the outlet opening of the suction and compression chambers 27, 28, 29. Hereby influence from volume in the fluid connection 21*a*, 21*b* during compression is avoided.

The container may be a pressure vessel in the form of a gas bottle, for example a diving tank or cylinder, a welding gas bottle/cylinder or the like.

The compressor 30 can also be used in combination with a condensing unit 36 in which the gas is liquefied.

In an embodiment the piston head 1*a*, the piston skirt 5 and the third piston 7 are provided with sealing means 18 (not shown for piston skirt 5 and third piston 7), such as piston rings or compression rings, for sealing during reciprocating movement of the parts in relation to the cylinder wall 2, 8, the second cylinder head 4 and the first cylinder head 3, respectively.

In an embodiment, sealing means 18 is provided in the openings of the cylinder heads 3, 4 through which the piston skirt 5 and the third stage piston 7 moves.

In an alternative embodiment between moving and non-moving parts of the pistons 1, 7 and cylinders 2, 8 is provided rider rings 19. Rider rings 19 are used mainly in oil free or mini-lube compressors for parts moving relative to each other. The function of rider rings 19 is to support or guide the piston 1, 7 assembly and prevent contact between the piston 1,7 and the cylinder 2, 8 (risk of seizure).

In a first embodiment the three-stage reciprocating compressor 30 comprises pistons 1, 7 and suction and compression chambers 27, 28, 29 in which a medium is compressed for each separate stage, which stages are connected in series and where a first stage is fluidly connected to an inlet 24 for inlet of uncompressed or pre-compressed gas where the three-stage pistons 1, 7 move synchronously along a common axis in one connected unit such that the first and second stage suction and compression chambers 27, 28 share piston 1 as well as cylinder wall 2, and having separate cylinder heads 3, 4, a top headpiece 3 and a bottom headpiece 4 on each side of the piston 1, the third stage piston 7 extending from a center of the first and second stage common piston 1 and is passed through an opening in the cylinder head 3 of the first stage suction and compression chamber 27, in extension of which is placed a third stage cylinder tube 8 with a smaller diameter than a diameter of the cylinder 2 for stage one and two, each stage fluidly separated by one or more one way valves 20*a*-20*f*, where the second stage suction and compression chamber 28 is formed between the cylinder wall 2 and a piston skirt 5 as well as between an underside of the piston 1 and the headpiece 4 placed in a bottom of the cylinder 2.

In an alternative embodiment, the piston 1 is formed by a piston head 1*a* and a piston skirt 5, where the piston head 1*a* has a larger diameter than the piston skirt 5 whereby an underside of the piston head 1 and an outer side of the piston skirt 5 together with the cylinder wall 2 and the headpiece 4 placed in a bottom of the cylinder 2 forms the second stage suction and compression chamber 28.

In an embodiment, the third stage piston 7 is connected to the piston head 1*a* of stage one and two by a piston rod (not shown).

In an embodiment, at least one of the top headpiece 3 or bottom headpiece 4 is provided with rider rings for guiding the piston skirt 5 or piston 7 in relation to the cylinder wall 2, 8 or headpieces 3, 4.

In an embodiment, at least one of the top headpiece 3 or bottom headpiece 4 is provided with piston rings or compression rings for sealing to the piston skirt 5 or piston 7.

In an embodiment, the piston head 1 is provided with piston rings or compression rings for sealing against the cylinder wall 2.

In an embodiment, the piston skirt 5 is provided with piston rings or compression rings 18 for sealing against an opening in a cylinder head 4 or a cylinder wall 2.

In an embodiment, the first and second stage common piston 1 is provided with a one way valve (not shown) leading gas from stage one to stage two.

In an embodiment, a connecting rod 13 is rotatably connected within the piston skirt 5 in the piston head end 1*a* of the piston 1. The connecting rod 13 being connected to the piston 1 in the piston head end 1*a* causes the connection between the connecting rod 13 and the piston 1 to be as close to the third stage piston 7 as possible, resulting in less wear due to less strain on compression rings 18 and/or rider rings 19.

In an embodiment, the connecting rod 13 is rotatably connected within the piston skirt 5 in the piston head end 1*a* of the piston 1 at a distance from a bottom of the piston head 1*a* corresponding to ⅓ or less of a diameter of the piston head 1*a*.

In an embodiment, the connecting rod 13 can be connected to the underside of the piston 1.

In an alternative embodiment, the piston skirt 5 can form the connecting rod. This can be advantageous in case the construction of the drive means for the pistons 1, 7 comprises a cross-head (not shown), whereby the movement of the connection rod between the piston and the cross-head is linear.

Figure 2:
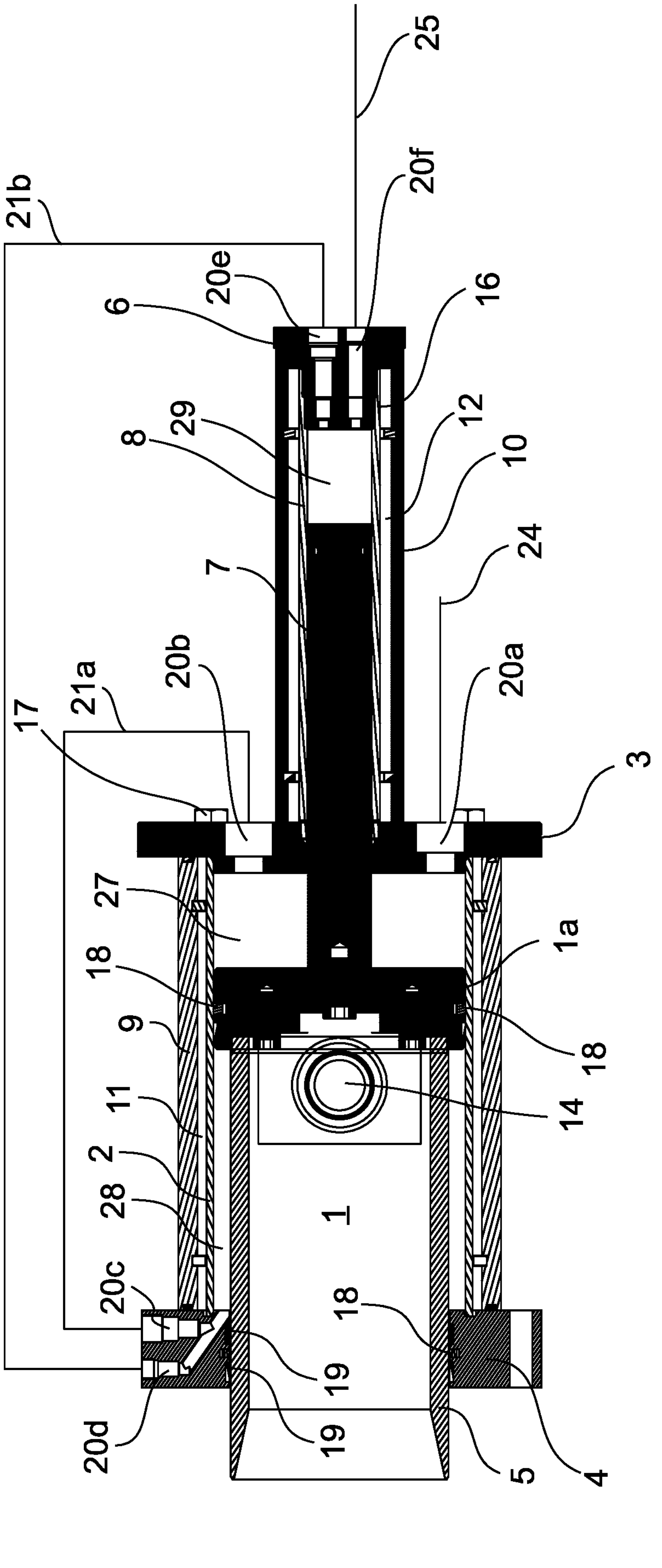
FIG. 2 shows an example of an enlarged view of the suction and compression chambers of the three-stage compressor shown in FIG. 1.
Figure 3:
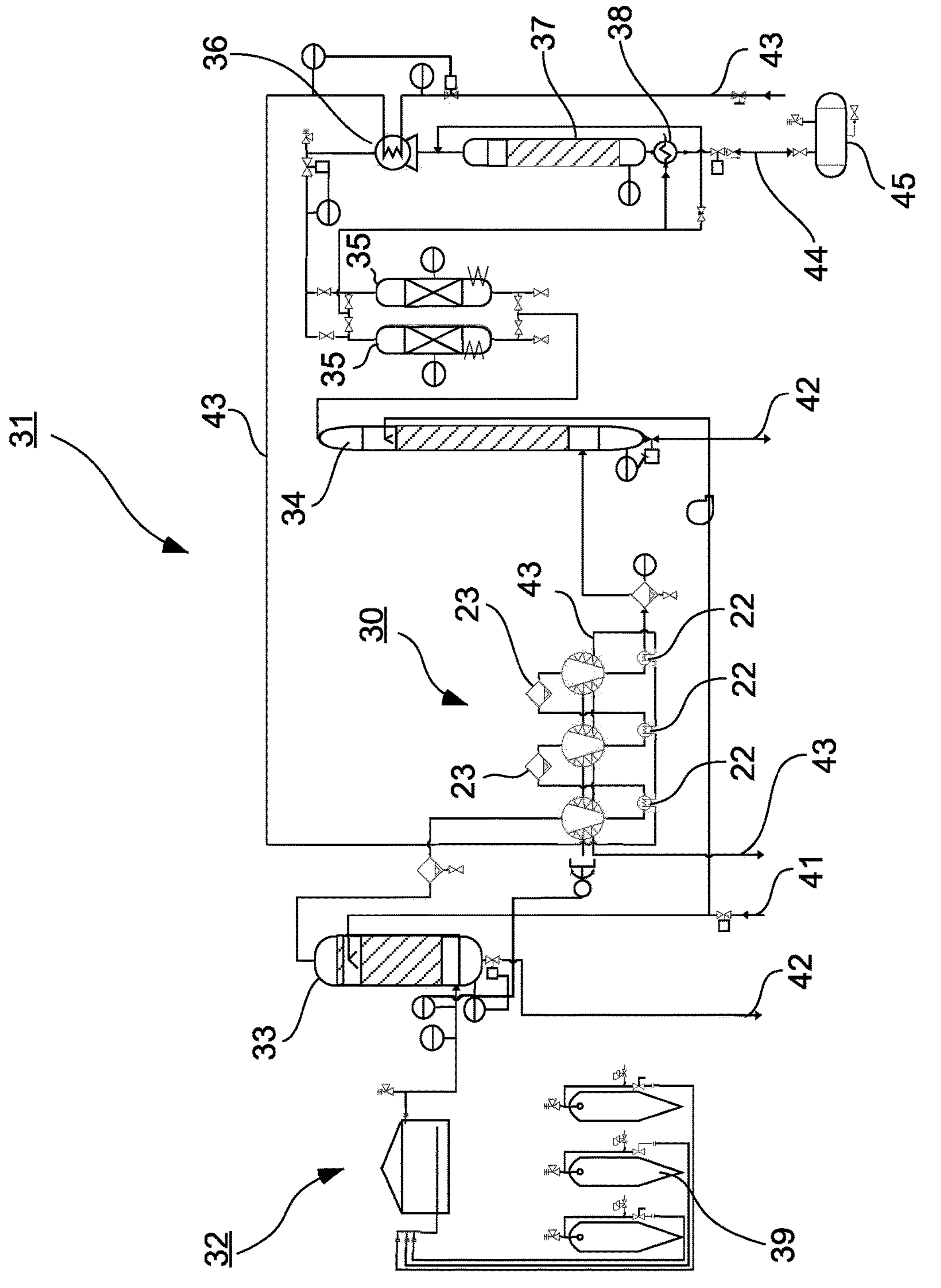
FIG. 3 shows an embodiment of a $CO_2$ regeneration system.

In an embodiment, cylinders of the suction and compression chambers 27, 28, 29 are made of cylindrical metal tubes and connected to the headpieces 3, 4, 6 by a threading 16 in end of the tubes engaging with a corresponding threading of the headpieces or by a number of threaded stays 17. This is shown in FIG. 2 as examples using both possibilities. It is clear, that only one of the options may be used alone.

In an embodiment, one or more of the cylinder walls 2, 8 are provided with a cooling jacket 9, 10 by providing the cylinder wall 2, 8 with a co-axial tube 9, 10 at the outside of the cylinder wall 2, 8, which co-axial tube 9, 10 is sealed at each end, leaving a space 11, 12 for cooling fluid and having an inlet and an outlet (not shown) for passing cooling fluid through said space 11, 12.

Such a solution makes it possible to use relatively non-expensive hydraulic pipes or tubes for construction of the cylinders.

In an embodiment of the first and second stage, the coaxial tubes forming the compression chambers 27, 28 and cooling jacket 9, are held together with stays 17, ie long bolts tightening the headpieces 3, 4 together around the coaxial tubes. The stays or bolts 17 are in an embodiment (not shown) located in a ring outside the diameter of the tubes 2, 9. The stays or bolts 17 are passed through spacers of pipes, keeping the headpieces 3, 4 parallel and at a precise distance from each other.

In third stage, the cylinder tube 8 for the compression chamber 29 is threaded at both ends and it is screwed into the headpiece 3 at one end and has its own headpiece 6 at the other end. Outside and around the cylinder tube 8, the cooling jacket 10 is located between the same cylinder heads 3, 6, which are large enough in diameter to cover the cooling jacket tube 10 and clamp both tubes 8, 10 in simultaneously.

In embodiments where the tubes 2, 8, 9, 10 are not provided with threading 16, recesses have been made to guide the ends and sealing rings are placed in the recesses for sealing of the compression and cooling/heating chambers (not shown).

In an embodiment, the compressors 30 capacity can be increased by assembling two identical, reciprocating compressors 30 according to the above embodiments, where the compressors are connected to the same actuator or crankshaft.

In an embodiment, the compressors 30 are arranged opposite to each other (not shown).

In an embodiment, the compressors 30 are arranged in an angle between 60 and 120 degree in relation to the crankshaft 15.

The compressors or cylinders of the compressor can be placed in a star shaped configuration.

Hereby torque peaks of the crankshaft are reduced.

In an alternative embodiment, the compressors are connected to a common connecting rod of the actuator (not shown).

In an embodiment, one or more of the cylinder heads 3, 4, 6 are made of metal.

In an embodiment, one or more of the cylinder heads 3, 4, 6 are made of plastic or carbon fiber.

In an embodiment, the one way valves 20*a*-20*f* are placed in the cylinder heads 3, 4, 6 and the fluid connections 21*a*, 21*b* connects the cylinder heads 3, 4, 6 as external pressure lines 21*a*, 21*b* connected to the cylinder head 4, 6 and valve of the next stage, and the pressure lines 21*a*, 21*b* are supplied with a cooling device 22, e.g. in the form of coolant flowing in coaxial pipes around the pressure lines 21*a*, 21*b*, and provided with water separators 23 between the chambers of the pressure stages 27, 28, 29.

According to a further aspect there is provided a system for a $CO_2$ regeneration plant 31 comprising a foam trap 32, a low pressure water scrubber 33, a stepless three-stage compressor 30 comprising one or more intercoolers or cooling units 22 and water separators 23, a regenerable dehydrator 35 and a condensing unit comprising a condenser 36 and a reboiler 38, where the compressor 30 is a three-stage reciprocating compressor according to one or more of the preceding disclosures or embodiments.

In an embodiment of the system, the system further comprises a high pressure water scrubber 34.

In an embodiment of the system, the regenerable dehydrator 35 contains a granulate capable of absorbing volatile gases, said gases being regenerated by heating the dehydrator 35. An example of such a granulate can be activated alumina.

In an embodiment of the system, an activated carbon filter (not shown) is placed before the regenerable dehydrator 35.

In an embodiment of the system, an activated carbon filter is integrated in the regenerable dehydrator 35. The integration of the carbon filter in the dehydrator can be carried out by adding activated carbon on top of the granulate in the regenerable dehydrator 35.

In an embodiment, the activated carbon filter is combined with the regenerable dehydrator, for example by combining activated alumina and activated carbon in a chamber, which chamber can be a tube or an extended tube.

Preferably more than one regenerable dehydrator is provided in parallel, in order to operate one or more dehydrators, while one or more dehydrators are regenerated by heating.

In an embodiment the regenerable dehydrator can be a length of tubing first filled ¾ by a granulate such as activated alumina followed by filling the remaining ¼ of the tubing with activated carbon. The length of tubing is in each end provided with a net or grating, preferable made of stainless steel for keeping the granulate and activated carbon in place in the tubing.

In an embodiment of the system, the regenerable dehydrator 35 is an adsorber.

In an embodiment of the system, the speed of the compressor 30 is variable between 0 to full speed where the speed is controlled by a pressure sensor (not shown) placed in the system before the compressor 30, keeping the inlet pressure at an interval between 0.1 and 1.0 bar (10 and 100 kPa), preferably between 0.2 and 0.5 bar (20 and 50 kPa).

The compressor and embodiments of the compressor 30 described above makes it possible to run a $CO_2$ regeneration plant 31 for example for smaller breweries, in such a way that refrigerants containing Freon and like unwanted refrigerants can be avoided in such a system.

CFC or ammonia refrigeration systems are expensive or require special permits.

By using this improved three-stage reciprocating compressor 30 makes it possible to press the compressed gas into a condensing unit 36, 37, 38 in which the gas is liquefied. Hereby it is possible condensing the gas, which gas can be $CO_2$ or another suitable gas in the condensing unit 36, 37, 38 at a pressure of 35-45 bar (3.5-4.5 Mpa).

By condensing the gas at a pressure high pressure of 35-45 bar (3.5-4.5 Mpa) it is possible to condense at temperatures around −5 to 2° C. and thereby it is possible to make use of a cooling system 43 present for cooling of fermenting tanks 39 in a brewery, avoiding use of CFC or ammonia refrigeration systems.

A suitable cooling media for such a cooling system 43 can be glycol or an alcohol based cooling media.

In an embodiment, the cooling system for the fermenting tanks 39 is used to cool of the $CO_2$ regeneration plant 31 and also cooling the compressor 30 through cooling units 22 as well as the condenser unit 36, 38.

Tubes and process units placed after the compressor 30 consists wholly or at least partially of stainless steel hydraulic pipes and fittings approved for pressures well above 45 bar (4.5 Mpa). Further the $CO_2$ regeneration plant 31 is made up by using hydraulic pipes without welding whereby certificate welding and approvals are avoided.

From the compressor 30, or between second and third stage of the compression, the compressed gas is directed to a high pressure scrubber 34, preferably a water scrubber.

Leaving the scrubber 34, the gas passes through a regenerable dehydrator 35 comprising an isolated stainless steel hydraulic pipe or tube, which is filled with a form of activated alumina. The dehydrator 35 comprises two preferably identical process units. Hereby it is possible to regenerate one unit while the other is in use and vice versa. The regeneration can be carried out by use of an electric heating band (not shown) placed under an isolating outer layer on the dehydrating units 35, heating the units to a temperature of 250-300° C. and at the same time flushing the tube with dry gas from degassing the condensing unit 36, 37.

The condenser 36 comprises a coaxial coil, where $CO_2$ rises from a bottom part of the coil, condenses on sides of the coil and runs down again in a countercurrent direction.

The cooling media flows in a cooling tube or hose placed in such a way that the coil presents a kind of double tube where the cooling tube or hose runs coaxially outside the tube of the coil.

In other words, the coil in the condenser 36 consist of a stainless steel hydraulic tube. The tube is covered by a tube or hose pulled on the outside of the helical or coiled tube forming a coil of concentric or coaxial tubes or hoses.

When the condensed $CO_2$ flows out in the bottom part of the coil, it continues in an embodiment into a small reboiler 38, which reboiler 38 comprises a pair of tubes arranged coaxially. The tubes can in an embodiment be between 30-100 cm long, preferably between 40 and 60 cm, more preferably 50 cm. The gas flowing towards the condensing unit flows through a tube surrounded by fluid $CO_2$. Hereby the gas is cooled and the liquid will be heated slightly until the liquid is boiling and any oxygen dissolved in the liquid $CO_2$ vapors together with the $CO_2$ vapor rising up through the coil In an embodiment the condensing unit also comprises a stripper 37.

The liquefied gas runs countercurrently down through the coil, stripping the liquid thoroughly by the rising gas that partially comes from its way up from the reboiler 38. From its way up from the reboiler 38, the liquid can be further stripped in the stripper 37 under the condenser coil 36.

By designing the process chamber as a coil, a large effective length of the chamber is obtained in relation to the actual physical extent. In an embodiment the effective length can be 8 m compared to a physical extent of 0.5 m.

Hereby an effective stripper function is achieved by a relatively small and very little space demanding unit compared to the outcome.

From the condenser unit 36, 37, 38 the $CO_2$ is directed through a pipe 44 into a storage vessel 45.

Fresh water is led to the scrubbers 33, 34 via one or more inlets 41 and the used water is led to drains 42.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A system for a $CO_2$ regeneration plant comprising a foam trap, a low pressure water scrubber, a stepless three-stage compressor comprising one or more intercoolers or cooling units and water separators, a regenerable dehydrator, a condensing unit comprising a condenser, where the stepless three-stage compressor comprises a three-stage reciprocating compressor, wherein the three-stage reciprocating compressor comprises pistons, suction and compression chambers in which a gas is compressed in a plurality of stages, where each stage of the plurality of stages is connected in series with at least one other stage of the plurality of stages and a first stage is fluidly connected to an inlet configured to receive uncompressed or pre-compressed gas, wherein the three-stage reciprocating compressor comprises three-stage pistons configured to move synchronously along a common axis in one connected unit such that first and second stage suction and compression chambers share a piston as well as a cylinder wall, a top headpiece, and a bottom headpiece on each side of the piston, wherein the three-stage reciprocating compressor comprises a third stage piston extending from a center of the piston through an opening in the top headpiece, the third stage piston comprises a third stage cylinder wall comprising a smaller diameter than a diameter of the cylinder wall for stage one and two, the third stage cylinder wall extends from the top headpiece, wherein each stage is fluidly separated by one or more one way valves, wherein a second stage suction and compression chamber is formed between the cylinder wall and a piston skirt as well as between an underside of the piston and the bottom headpiece placed in a bottom of the cylinder wall.

2. A system according to claim 1, wherein the system further comprises a high pressure water scrubber.

3. A system according to claim 1, wherein the regenerable dehydrator contains a granulate capable of absorbing volatile gases, the volatile gases being regenerated by heating the regenerable dehydrator.

4. A system according to claim 1, wherein an activated carbon filter is placed before the regenerable dehydrator.

5. A system according to claim 1, wherein an activated carbon filter is integrated in the regenerable dehydrator.

6. A system according to claim 1, wherein the regenerable dehydrator is an adsorber.

7. A system according to claim 1, wherein speed of the three-stage reciprocating compressor is variable between 0 to full speed where the speed is controlled by a pressure sensor placed in the system before the three-stage reciprocating compressor, keeping an inlet pressure at an interval between 0.1 and 1.0 bar (10 and 100 kPa), preferably between 0.2 and 0.5 bar (20 and 50 kPa).

8. A system according to claim 1, wherein a coil in the condenser is a coiled tube which is covered by a tube or hose pulled on an outside of the coiled tube forming a coil of concentric or coaxial tubes or hoses, in which outer tube or hose a cooling media can flow.

9. A system according to claim 1, where a cooling system for fermenting tanks for a brewery also cools the three-stage reciprocating compressor through cooling units as well as the condensing unit of the $CO_2$ regeneration plant.

10. A system according to claim 1, where a reboiler heated by the gas before entering the condenser is placed below a condensation coil and a gas stripper in a way that an evaporation of $CO_2$ will be stripping a fluid $CO_2$ for impurities like oxygen through the gas stripper and along a coil in the condenser.

11. A system according to claim 10, wherein the reboiler comprises a pair of tubes arranged coaxially.

12. The system of claim 1, wherein the third stage piston is connected to a head of the piston of stage one and two by a piston rod.

13. The system of claim 1, wherein at least one of the top headpiece or bottom headpiece is provided with rider rings for guiding the piston skirt or piston in relation to the cylinder wall or headpieces.

14. The system of claim 1, wherein at least one of the top headpiece or bottom headpiece is provided with piston rings or compression rings for sealing to the piston skirt or third stage piston skirt.

15. The system of claim 1, wherein the pistons are provided with piston rings or compression rings for sealing against the cylinder wall.

16. The system of claim 1, wherein the piston skirt is provided with piston rings or compression rings for sealing against an opening in the bottom headpiece or the cylinder wall.

17. The system of claim 1, wherein the piston is provided with a one way valve leading gas from stage one to stage two.

18. The system of claim 1, wherein a connecting rod is rotatably connected within the piston skirt in a head end of the piston.

19. The system of claim 18, wherein the connecting rod is rotatably connected within the piston skirt in the head end of the piston at a distance from a bottom of the head end of the piston corresponding to ⅓ or less of a diameter of the head end of the piston.

20. The system of claim 1, wherein cylinders of the first and second stage suction and compression chambers are made of cylindrical metal tubes and connected to the top headpiece and the bottom headpiece and to a third headpiece by a threading in an end of the cylindrical metal tubes engaging with a corresponding threading of the top headpiece and the bottom headpiece or by a number of threaded stays.

21. The system of claim 1, wherein the cylinder wall and/or the cylinder wall are provided with a cooling jacket by providing the cylinder wall with a co-axial tube at an outside of the cylinder wall, which co-axial tube is sealed at each end, leaving a space for cooling fluid and having an inlet and an outlet for passing cooling fluid through said space.

* * * * *